(12) United States Patent
Kang et al.

(10) Patent No.: US 8,612,433 B2
(45) Date of Patent: Dec. 17, 2013

(54) SYSTEM AND METHOD FOR PROVIDING SEARCH RESULT BASED ON PERSONAL NETWORK

(75) Inventors: In Ho Kang, Seongnam-si (KR); Soo Hyun Kim, Seongnam-si (KR); O Shik Kwon, Seongnam-si (KR); Chan Hoon Park, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 0 days.

(21) Appl. No.: 13/239,161

(22) Filed: Sep. 21, 2011

(65) Prior Publication Data

US 2012/0084284 A1 Apr. 5, 2012

(30) Foreign Application Priority Data

Sep. 30, 2010 (KR) .......................... 10-2010-0095545

(51) Int. Cl.
*G06F 17/30* (2006.01)
(52) U.S. Cl.
USPC ......................................................... 707/732
(58) Field of Classification Search
USPC .................. 707/732, 707, 765, 784
See application file for complete search history.

(56) References Cited

U.S. PATENT DOCUMENTS

| | | | | |
|---|---|---|---|---|
| 7,047,202 | B2 * | 5/2006 | Jaipuria et al. | 705/51 |
| 7,921,167 | B2 * | 4/2011 | Shroff et al. | 709/206 |
| 8,122,047 | B2 * | 2/2012 | Kanigsberg et al. | 707/765 |
| 8,204,878 | B2 * | 6/2012 | Amer-Yahia et al. | 707/723 |
| 2005/0216823 | A1 * | 9/2005 | Petersen et al. | 715/501.1 |
| 2006/0089913 | A1 * | 4/2006 | Jaipuria et al. | 705/51 |
| 2007/0203906 | A1 * | 8/2007 | Cone et al. | 707/6 |
| 2008/0104225 | A1 * | 5/2008 | Zhang et al. | 709/224 |
| 2008/0255977 | A1 * | 10/2008 | Altberg et al. | 705/35 |
| 2010/0153215 | A1 * | 6/2010 | Abraham | 705/14.55 |
| 2010/0174709 | A1 * | 7/2010 | Hansen et al. | 707/728 |
| 2011/0113094 | A1 * | 5/2011 | Chunilal | 709/204 |
| 2011/0179019 | A1 * | 7/2011 | Amer-Yahia et al. | 707/723 |
| 2012/0065969 | A1 * | 3/2012 | DeLuca et al. | 704/235 |

* cited by examiner

*Primary Examiner* — Cam-Linh Nguyen
(74) *Attorney, Agent, or Firm* — H.C. Park & Associates, PLC

(57) ABSTRACT

A system and method for providing a search result based on a personal network are disclosed. The search result providing system may include a search term reception unit, a personal network extraction unit, and a search result providing unit which may receive a search term from a user. The personal network extraction unit may extract at least one of a personal network associated with the search term, and a personal network associated with the user. The search result providing unit may provide documents associated with the personal networks as a search result of the search term. A search result optimized for the user may be provided to the user by searching for information corresponding to the search term from communities joined by another user having similar interests to that of the user, or communities joined by the user, based on personal networks of the user.

20 Claims, 8 Drawing Sheets

811
[Dr. Lee] Smart phone app for doctor...
How could live without a smart phone...
Useful apps for doctor among numerous apps...
http://cafe.aaaa.com/mp3/12345
less associated Daddy's Review of smart phone app...
App to alert location of speed camera...
Full version for smart phone...
http://cafe.bbbb.com/phone/23456

Smart phone/App
Link to download... new smart phone
app heard from forum...
http://cafe.cccc.com/dong/34567

812
Additional source essential app...
Virus...view internal files of smart...
Required when connecting smart...
http://cafe.dddd.com/cafe/45678
less associated

820

821
Top smart phone app finally...
Smart phone app with absolutely best
advantages Download this app...
http://cafe.bbbb.com/chr travel

Smart phone multitasking
Link to download... new smart phone
app heard from forum...
http://cafe.cccc.com/dong from China travel
User cafe/highly associated

App China map
It was around winter... had difficulty...
Step 2 Skip... App...
http://cafe.dddd.com/ China travel

822
Free smart phone app!!
Download smart phone app for free.
No apps seem to be related to...
http://cafe.eeee.com/top/ Backpacking
Personal-network-extended cafe/likely
to be highly associated

SYSTEM AND METHOD FOR PROVIDING SEARCH RESULT BASED ON PERSONAL NETWORK

CROSS REFERENCE TO RELATED APPLICATION

This application claims priority from and the benefit of Korean Patent Application No. 10-2010-0095545, filed on Sep. 30, 2010, which is hereby incorporated by reference for all purposes as if fully set forth herein.

BACKGROUND OF THE INVENTION

1. Field of the Invention

Exemplary embodiments of the present invention relate to a system and method for providing a search result based on a personal network, and to a system and method that may search for information corresponding to a search term from neighbors having similar interests to that of a user, communities joined by the neighbors, or communities joined by the user, thereby providing the user with a search result optimized for the user.

2. Discussion of the Background

A conventional system for providing a search result typically extracts and provides a general search result based on a general user profile, and arranges and displays the extracted search result. Accordingly, when a user desires to search for information specific to the user, the information that the user wants may be difficult to search for. In order to obtain and exchange specific information, users tend to form personal networks and to join a community actively sharing information among members.

However, in some cases, the user may experience difficulty in finding a community to join, where the information desired by the user may be exchanged. Accordingly, there is a need for a system and method that may recommend a community that the user desires, and may display information optimized for a user, from a search result depending on a preference of the user.

SUMMARY OF THE INVENTION

Exemplary embodiments of the present invention provide a system and method for providing a user with a search result optimized for the user, by searching for information corresponding to a search term from neighbors having similar interests to that of a user, communities joined by the neighbors, or communities joined by the user, which may be included in a personal network of the user.

Exemplary embodiments of the present invention also provide a system and method for inducing a user to join a community that the user may be interested in, by recommending communities not yet joined by the user, through a personal network of the user.

Additional features of the invention will be set forth in the description which follows, and in part will be apparent from the description, or may be learned by practice of the invention.

Exemplary embodiments of the present invention disclose a system to provide a search result. The system includes a search term reception unit, a processor, and a search result providing unit. The search term reception unit receives a search term. The processor extracts information corresponding to at least one of a first personal network associated with the search term and a second personal network different than the first personal network. The search result providing unit provides a document associated with at least one of the first personal network and the second personal network as a search result of the search term.

Exemplary embodiments of the present invention also disclose a method that utilizes a processor to provide a search result. The method includes receiving a search term, extracting, via the processor, information corresponding to at least one of a first personal network associated with the search term and a second personal network different than the first personal network. The method also includes providing a document associated with at least one of the first personal network and the second personal network as a search result of the search term.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 8 is a diagram illustrating an example of a search result according to exemplary embodiments of the present invention.

DETAILED DESCRIPTION OF THE ILLUSTRATED EMBODIMENTS

Figure 1:
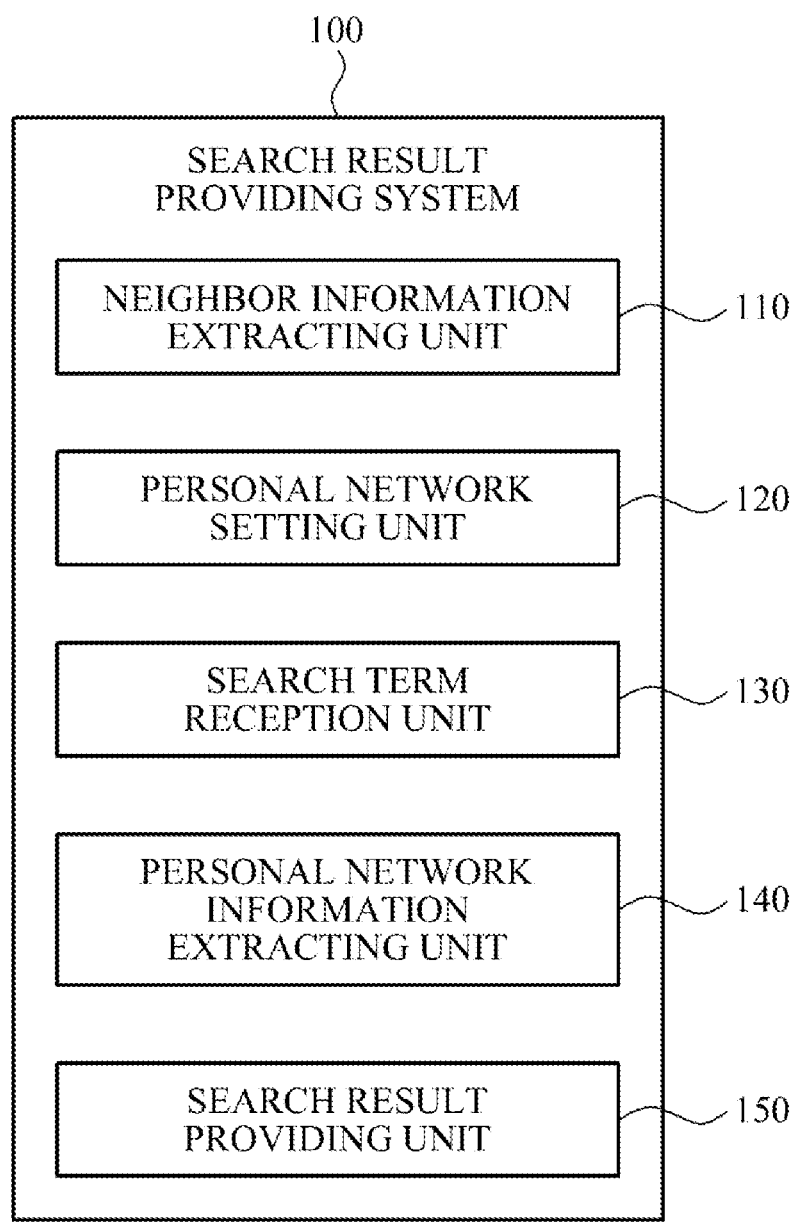
FIG. 1 is a diagram illustrating a configuration of a system for providing a search result according to exemplary embodiments of the present invention.

Exemplary embodiments of the invention are described more fully hereinafter with reference to the accompanying drawings. The invention may, however, be embodied in many different forms and should not be construed as limited to the exemplary embodiments set forth herein. Rather, the exemplary embodiments are provided so that this disclosure is thorough and complete, and will convey the scope of the invention to those skilled in the art. In the drawings, the size and relative sizes of layers and regions may be exaggerated for clarity and like reference numerals in the drawings denote like elements. Detailed descriptions of well-known functions and structures incorporated herein may be omitted to avoid obscuring the subject matter of the present invention.

It will be understood that, although the terms first, second, third etc. may be used herein to describe various elements, components, regions, layers and or sections, these elements, components, regions, layers and or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing exemplary embodiments only, and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It should be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning For example consistent with their meaning in the context of the relevant art and will not be interpreted in an idealized or overly formal sense unless expressly so defined herein.

Hereinafter, exemplary embodiments of the present invention will be described in detail with reference to the accompanying drawings.

FIG. 1 is a diagram illustrating a configuration of a system 100 for providing a search result according to exemplary embodiments of the present invention.

The search result providing system 100 may provide documents associated with a search term as a search result. The provided documents may be prepared by neighbors or documents of a community related to the user. The community may be an internet group having members with similar interests, members who are friends, members with common interests, or, in general, may be any group of individuals who have joined the community. The community may include a personal network of the user having input the search term. Thus, by providing a search result among documents prepared by neighbors or documents of a community, the user may obtain a search result that more closely matches a search result the user truly desires. The personal network of the user may include neighbors having similar interests to that of the user, communities joined by the neighbors, and/or communities joined by the user. The personal network of the user may include a first neighbor, a second neighbor, up to an $N^{th}$ neighbor, where N is any real number greater than or equal to 2.

Referring to FIG. 1, the search result providing system 100 may include a neighbor information extraction unit 110, a personal network setting unit 120, a search term reception unit 130, and a personal network information extraction unit 140, and a search result providing unit 150.

The neighbor information extraction unit 110 may extract information on a neighbor having similar interests to that of the user. For example, the neighbor information extraction unit 110 may extract information corresponding to a neighbor of the user based on a profile of the user or neighbor information of the user. For instance, the neighbor extraction unit 110 may extract information on at least one other user who is a neighbor of the user based on an association between keywords in the profile of the user, and keywords in a profile of the at least one other user.

The keywords constituting the profile of the user may be determined based on keywords included in documents prepared by the user. Documents prepared by the user may include, for example, posts uploaded by the user to multiple websites, such as a cafe, a blog, and/or a personal homepage. The keywords constituting the profile of the user may be extracted based on a frequency of the keywords in the documents prepared by the user. For example, the keywords in the documents prepared by the user may be arranged based on a frequency, and the top keywords (i.e., keywords having the highest frequency) may be determined to be the keywords constituting the profile of the user.

Neighbor information of the user may be determined based on at least one of a social network of the user, an e-mail address book, and Really Simple Syndication (RSS) subscription information. For example, users included in a social network (e.g., blog neighbors, community members, and micro-blog friends), users included in an e-mail address book, and other users subscribing to the same RSS may be neighbors of the user that input the search term.

The neighbor information extraction unit 110 may extract, based on the profile of the user, information on other users having similar interests to that of the user. Since the profile of the user may include keywords included in documents prepared by the user, recent interests of the user may be reflected in the profile of the user. The interests of the user may vary and be time dependent information (e.g., user interests may change with time or due to other factors), and accordingly the keywords included in the documents prepared by the user may be variable. For example, at a first time, the user may be interested in a keyword A. However, the user may be interested in a keyword B at another time (e.g., next day, week, or month). Accordingly, the keywords constituting the profile of the user may vary with time. The keywords constituting the profile of the user may also vary based on an age of the user. The neighbors of the user may also change according to the change in the keywords, and at least one other user to be determined to be the neighbor of the user may correspond to a user currently having similar interests to that of the user having input the search term.

The neighbor information extraction unit 110 may extract information on a first neighbor up to an $N^{th}$ neighbor having similar interests to that of the user. N may be a value greater than or equal to 2. A relationship between people on a social network may be defined by a particular medium, such as a blog, and a microsite. Moreover, because associations between people on a social network may occur when they have similar interests, information on the neighbors may continuously be extended and extracted based on a search term input by the user.

The neighbor information extraction unit 110 may extract information corresponding to another user, having a relationship as a first neighbor, with the user having input the search term. The other user may be derived from the neighbor information of the user. When an association between keywords included in the profile of the user having input the search term and keywords included in a profile of the other user corresponding to the first neighbor is greater than a predetermined value, the other user may be designated as a first neighbor of the user. The association between the keywords may be determined differently based on an identical relation, a synonym relation, and an extension relation between the keywords in the respective profiles.

In some cases, the neighbor information extraction unit 110 may extract information corresponding to a second neighbor of the user based on information corresponding to the first neighbor of the user. The first neighbor and the second neighbor may have similar interests, and accordingly the second neighbor's information may be extracted based on an association between keywords included in a profile of the first neighbor, and keywords in a profile of the second neighbor. Information may be extracted for N neighbors wherein N may be real variable number greater or equal than 2 depending on a configuration of the system.

The personal network setting unit 120 may set at least one of a community joined by the user, a neighbor(s) of the user, and a community joined by the neighbor, to be a personal network of the user. The personal network may include neighbors and communities. Up to N number of neighbors may be determined, where N is a natural number greater than or equal to 2. Information on the communities joined by the user may be extracted based on activities of the user in the communities, and information on the communities joined by a neighbor may be extracted based on activities of the neighbor.

A personal network of another user, having similar interests to that of the user, may be provided by the neighbor information extraction unit 110 and the personal network setting unit 120. Since the interests of the user may be variable and dynamic, the personal network of the other user may also be variable and dynamic.

The search term reception unit 130 may receive the search term from the user. Then, the personal network information extraction unit 140 may extract information corresponding to at least one of a personal network associated with the search term and a personal network associated with the user, from personal networks of the user. For example, the personal network information extraction unit 140 may arrange the set personal network of the user based on at least one of an association with the search term and an association with the user, and may extract information corresponding to a neighbor or a community included in an $N^{th}$-ranked personal network from a highest ranking personal network.

As aforementioned, the personal network of the user may include a first neighbor up to an $N^{th}$ neighbor, a community joined by the user, and a community joined by the neighbors. The personal network information extraction unit 140 may extract information corresponding to the personal network of the user for providing a search result based on the association with the search term and information corresponding to the personal network of the user.

The search result providing unit 150 may provide documents associated with the personal network of the user as a search result of the search term. When the extracted information corresponding to the personal network corresponds to a neighbor's information, the search result providing unit 150 may provide documents prepared by the corresponding neighbor as the search result. The documents prepared by the neighbor may include documents prepared by at least one neighbor among neighbors from the first neighbor to the $N^{th}$ neighbor. When the extracted information corresponding to the personal network corresponds to a community, the search result providing unit 150 may provide documents included in the community as the search result.

The search result providing unit 150 may arrange documents associated with the extracted information corresponding to the personal network, among documents associated with the search term, based on an association between the user and the personal network, and may provide the arranged documents as a search result of the search term. The documents associated with the extracted information corresponding to the personal network may include at least one of documents associated with neighbors of the user, communities joined by the user, and communities joined by the neighbors. For example, the search result providing unit 150 may place documents associated with the communities joined by the user at a higher ranking than documents associated with communities joined by the neighbors of the user, in the search result of the search term. The communities joined by the user may be placed at a higher ranking in the search result since the communities joined by the user may reflect the interests of the user more precisely than the communities joined by the neighbors. In addition, the search result providing unit 150 may recommend, to the user, communities not yet joined by the user among the communities joined by the neighbors, based on an association with the search term or an association with the user. Since the communities included in the personal network of the user may be related to at least the interests of the user, the communities not yet joined by the user among the communities joined by the neighbors may be recommended to the user, in view of extension of a social network.

The search result providing unit 150 may provide the documents associated with the personal networks as the search result of the search term, by arranging the documents associated with the personal networks among documents associated with the search term based on an order of net association. An association with respect to the search term and an association between the user and the personal networks may be combined.

A process of providing a search result will be described hereinafter.

Figure 2:
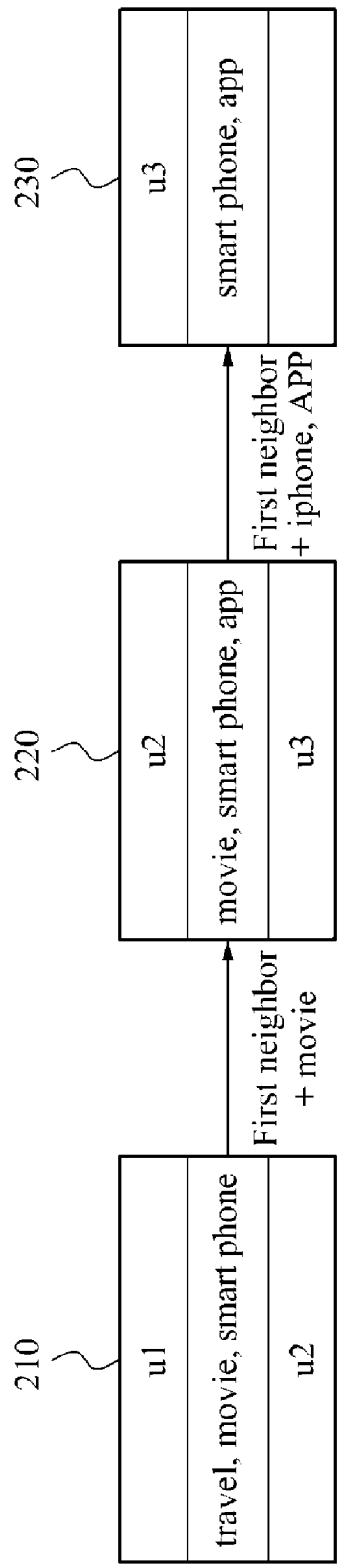
FIG. 2 is a diagram illustrating an example of user profiles according to exemplary embodiments of the present invention.

FIG. 2 is a diagram illustrating an example of user profiles according to exemplary embodiments of the present invention.

Referring to FIG. 2, profiles of each user are illustrated and it may be assumed that a user u1 210 corresponds to a person having input a search term. As illustrated in FIG. 2, a profile of a user may include user identification (id) information, keywords included in documents prepared by the user, and id information of a neighbor of the user having input the search term.

The keywords included in the documents prepared by the user may correspond to keywords included in documents where interests of the user may be indicated through a community, a site, a personal homepage, a cafe, and/or a blog.

Referring to FIG. 2, a user u2 220 may correspond to a first neighbor of user u1 210, and a user u3 230 may correspond to an extended second neighbor of user u1 210. Information of the first neighbor (user u2 220) and the extended second neighbor (user u3 230) may be extracted with respect to the user u1 210. Information on user u2 220 corresponding to the first neighbor may be extracted by calculating an association between keywords of the user u1 210 and keywords of the user u2 220. The association between the keywords may be differently determined based on an identical relation, a synonym relation, and/or an extension relation between the keywords included in the profiles.

The keywords constituting the profile of the user u1 210 may be extracted from documents prepared by the user u1

210. The keywords constituting the profile of the user u2 220 may be extracted from documents prepared by the user u2 220, and the keywords constituting the profile of the user u3 230 may be extracted from documents prepared by the user u3 230.

Information on the user u3 230 may be extracted based on the user u2 220 being the first neighbor of the user u1 210. For example, information on the user u3 230 may be extracted by calculating an association between the keywords of the user u2 220 and the keywords of the user u3 230. The user u3 230 may be considered to be a second neighbor of the user u1 210 and may have similar interests to that of the user u1 210. Neighbors having a relationship as a neighbor with the user u1 210, extended from the first neighbor to an $N^{th}$ neighbor, may be continuously extracted. Here, N may be variable depending on a configuration of the system.

Keywords of the user u1 210 may indicate current interests of the user u1 210, and may vary depending on time. Thus, neighbors of the user u1 210 may be extracted differently depending on the variable keywords.

Figure 3:
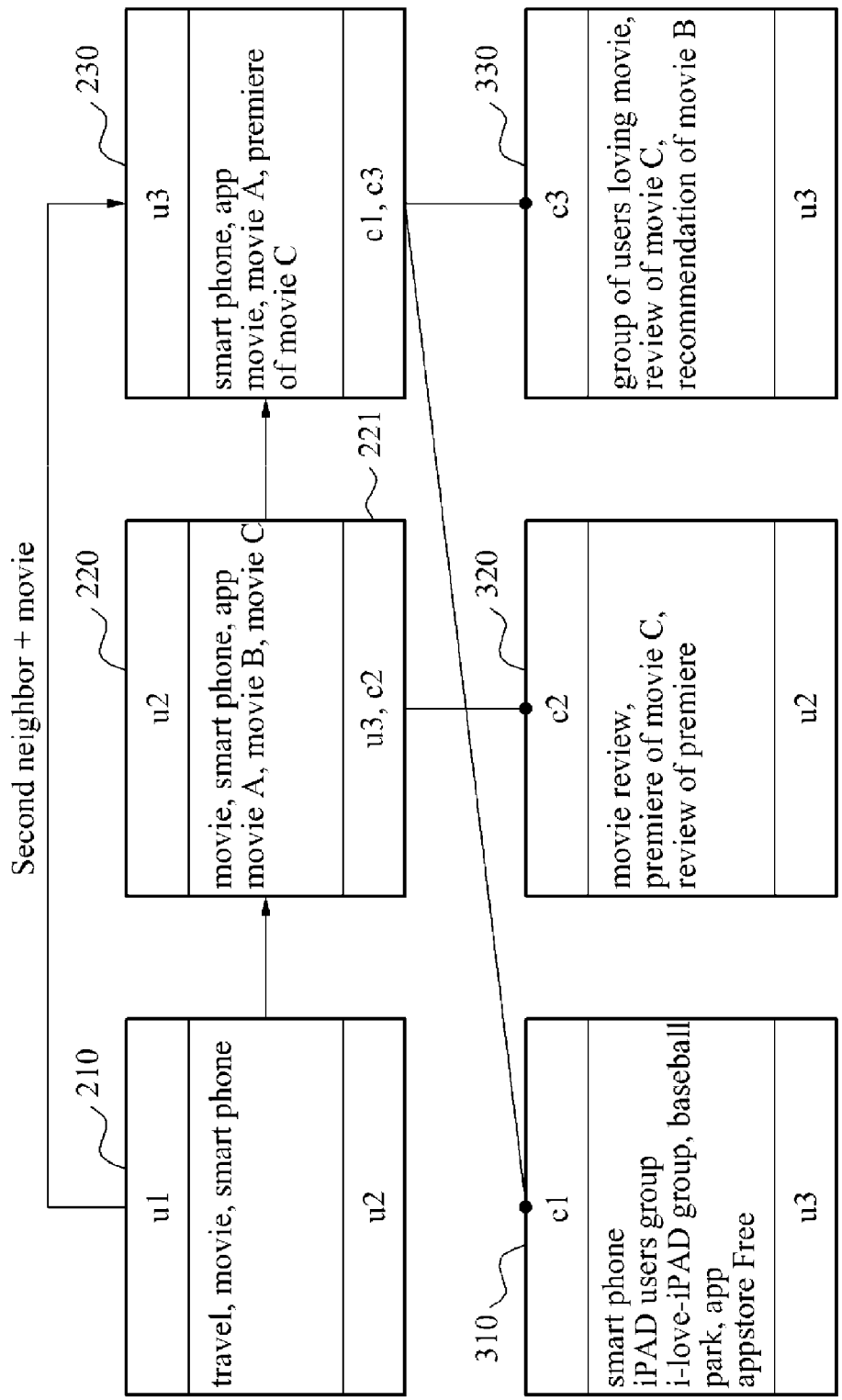
FIG. 3 is a diagram illustrating user and community profiles according to exemplary embodiments of the present invention.

FIG. 3 is a diagram illustrating user and community profiles according to exemplary embodiments of the present invention.

Profiles of communities may be generated as shown in FIG. 3. The profiles of the communities may include community id information, keywords of documents in the communities, and id information of users who have joined the communities, with respect to each of a community c1 310, a community c2 320, and a community c3 330.

Referring to FIG. 2 and FIG. 3, the user u2 220 and the user u3 230 may be neighbors of the user u1 210 having input the search term. The personal network setting unit 120, as shown in FIG. 1, may configure the personal networks of the user u1 210, the community c1 310, the community c2 320, and the community c3 330 which may be joined by at least one of the neighbors of the user u1 210, for example, the user u2 220 and the user u3 230. The personal network setting unit 120 may also set communities joined by the user u1 210 to be a personal network of the user u1 210.

The personal networks of the user u1 210 may include neighbors of the user u1 210, for example, the user u2 220 and the user u3 230, communities joined by the user u1 210, or communities joined by each of the user u2 220 and the user u3 230. Although the communities joined by the user u2 220 and the user u3 230 may not be joined directly by the user u1 210, the communities may be determined to be the personal networks of the user u1 210, and accordingly the personal networks of the user u1 210 may include an extended range of communities.

Figure 4:
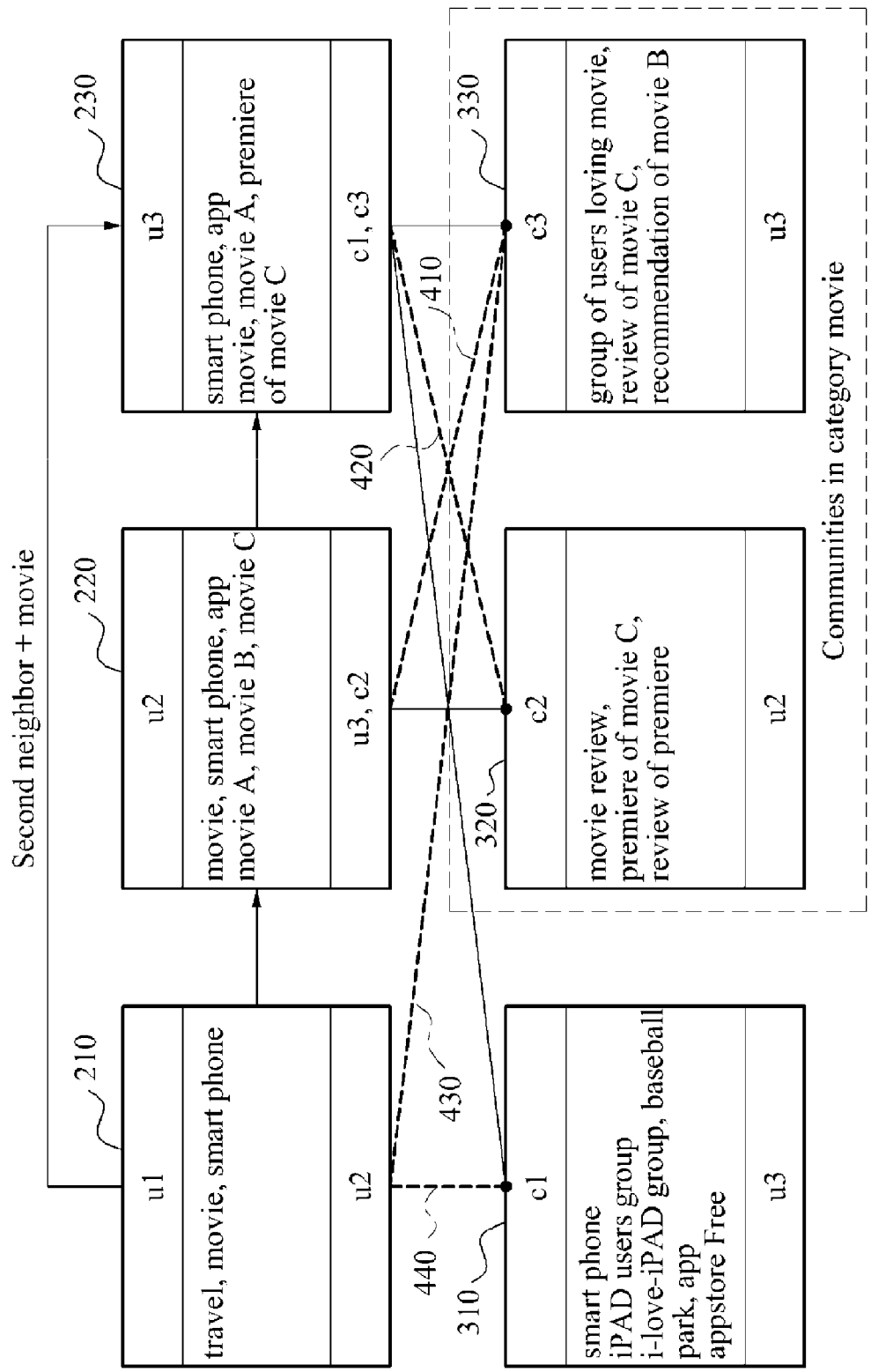
FIG. 4 is a diagram illustrating a community recommending system for a user according to exemplary embodiments of the present invention.

FIG. 4 is a diagram illustrating a community recommending system for a user according to exemplary embodiments of the present invention.

Referring to FIG. 4, the community c2 320 and the community c3 330 may be related to a keyword "movie" included in documents prepared by the user u1 210. The search result providing unit 150 may calculate an association with the search term or an association with the user u1 210, among the personal networks of the user u1 210. The search unit providing unit 150 may arrange the personal networks according to a ranking order of the association with the search term, and may then recommend, to the user u1 210, the community c1 310, the community c2 320, and the community c3 330 according to the ranking order. The recommended communities may not yet have been joined by the user u1 210. When the user u1 210 joins the community c1 310 and the community c3 330, a social network may be extended and the interests of the user u1 210 may be clarified.

The search result providing unit 150 may also recommend communities not yet joined by the user u2 220 and the user u3 230, to the user u2 220 and the user u3 230. For example, communities associated with interests of each of the user u2 220 and the user u3 230 within a certain ranking order, among all communities, may be recommended.

Figure 5:
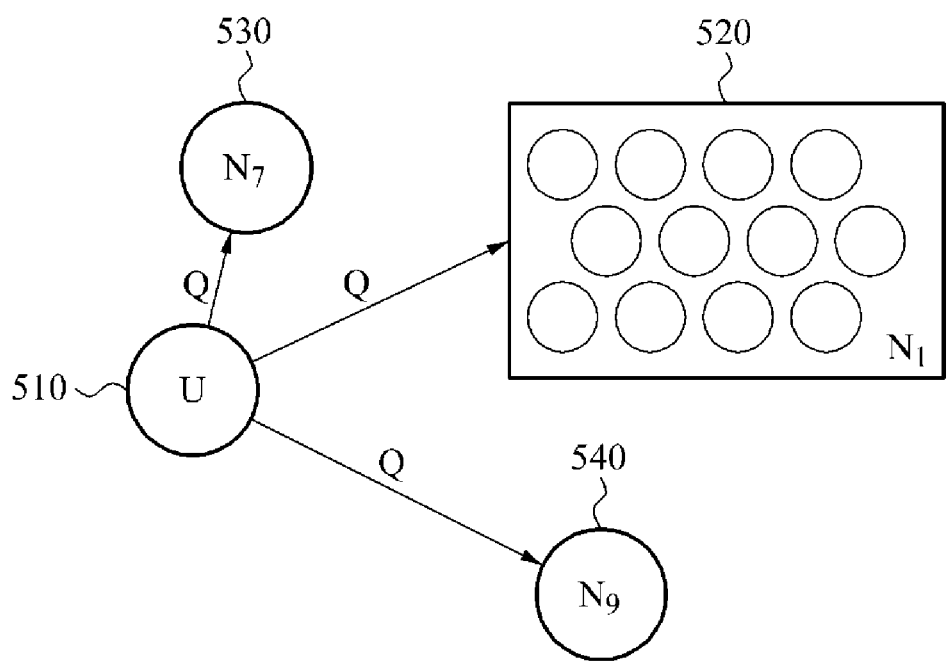
FIG. 5 is a diagram illustrating an association among a user, a search term, and a personal network according to exemplary embodiments of the present invention.

FIG. 5 is a diagram illustrating an association among a user, a search term, and a personal network according to exemplary embodiments of the present invention.

The personal network information extraction unit 140 may extract at least one of a personal network associated with a search term and a personal network associated with a user. The personal network information extraction unit 140 may calculate an association between the personal network and the search term and an association between the personal network and the user, based on a preference score function $S(U, N_i, Q)$, which is determined by Equation 1 as noted below.

$$S(U, N_i, Q) = P(N_i \mid U) P(N_i \mid Q) \qquad \text{[Equation 1]}$$

$$= P(N_i \mid U) \cdot \sum_{q \in Q} P(N_i \mid q) P(q \mid Q)$$

$$\propto \log\left( P(N_i \mid U) \cdot \sum_{q \in Q} P(N_i \mid q) P(q \mid Q) \right)$$

$$= \log(P(N_i \mid U)) + \log\left( \sum_{q \in Q} P(N_i \mid q) P(q \mid Q) \right)$$

$$\approx \beta \cdot QIP(N_i, U) + \gamma \cdot QDP(N_i, Q)$$

In Equation 1, $N_i$ denotes a node of an $i^{th}$ personal network, U denotes a user 510 as shown in FIG. 5, and Q denotes a search term, where $\beta$ and $\gamma$ are constants. When the user 510 inputs the search term, personal networks (e.g., a personal network 520, a personal network 530, and a personal network 540) associated with the search term may be identified. The personal networks may include at least one of neighbors of the user 510, communities joined by the user 510, and communities joined by the neighbors of the user 510.

The search term may include multiple words q, for example, $Q = \{q_1, q_2, \ldots, q_n\}$. $QIP(N_i, U)$ denotes an association between the user 510 and a personal network, that is, a query independent preference function, and $QDP(N_i, Q)$ denotes an association between the search term and the personal network, that is a query dependent preference function.

Figure 6:
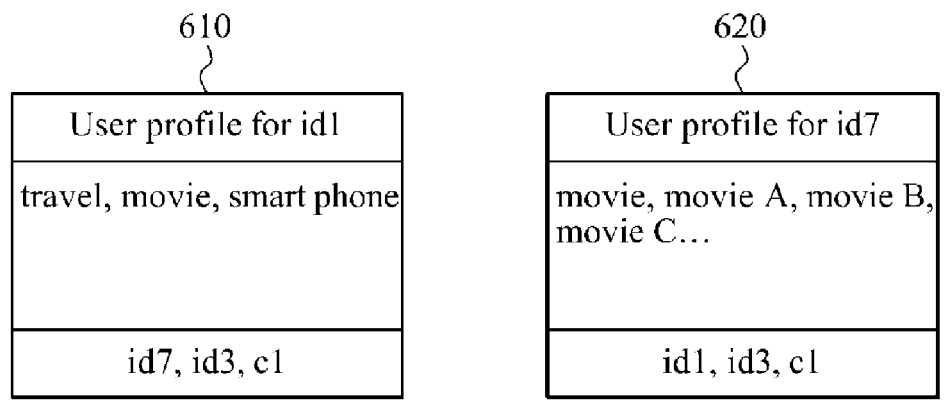
FIG. 6 is a diagram illustrating user profiles having common neighbors and communities used to calculate an association between a personal network and a user according to exemplary embodiments of the present invention.

FIG. 6 is a diagram illustrating user profiles having common neighbors and communities used to calculate an association between a personal network and a user according to exemplary embodiments of the present invention.

Equation 2 is an equation for calculating an association between the user and the personal network $QIP(N_i, U)$ as noted in Equation 1. The association between the user and the personal network may be determined using Equation 2, as noted below.

$$QIP(N_i, U) = \qquad \text{[Equation 2]}$$

$$\lambda_1 \cdot \frac{\sum_{j=1}^{n} t_{N_i,j} * t_{U,j} + 1}{\sqrt{\sum_{j=1}^{n} t_{N_i,j}^2} * \sqrt{\sum_{j=1}^{n} t_{U,j}^2}} + \lambda_2 \cdot \frac{\sum_{j=1}^{m} u_{N_i,j} * u_{U,j} + 1}{\sqrt{\sum_{j=1}^{m} u_{N_i,j}^2} * \sqrt{\sum_{j=1}^{m} u_{U,j}^2}}$$

$f_{N_i}$ denotes a feature set of a personal network extracted from a profile of a personal network, where $f_{N_i} = \{(t_{N_i,1}, t_{N_i,2}, \ldots, t_{N_i,n}), (u_{N_i,1}, u_{N_i,2}, \ldots, u_{N_i,m})\}$. $t_{N_i,j}$ denotes a weight of an $i^{th}$ word in the profile of the personal network, $u_{N_i,j}$ denotes an associated weight between personal networks, $t_{u,j}$ denotes a weight of an $i^{th}$ word in the profile of the user, and $u_{u,j}$ denotes an associated weight between users, where $\lambda_1, \lambda_2, n,$ and m are constants.

Referring FIG. 6, a profile of a user id1 610 and a profile of a user id7 620 is illustrated. The keywords that the user id1 610 may be interested in correspond to "travel, movie, smart phone", and keywords that the user id7 620 may be interested in correspond to "movie, movie A, movie B, and movie C." Neighbors of the user id1 610 may include user id7 and a user id3. Communities joined by the user id1 610 include community c1. Neighbors of the user id7 620 correspond to the user id1 610 and the user id3. Communities joined by the user id7 620 include community c1. The user id1 610 and the user id7 620 may be neighbors, may have joined the same community c1, and may have a common neighbor, user id3.

$f_{N_1}$ of the user id1 610 may correspond to {t(movie)=0.7, t(smart phone)=0.3, ... }, (u(id7)=0.5, u(id3)=0.2, u(c1)=0.1, ... ), and $f_{N_7}$ of the user id7 620 may correspond to {(t(movie)=0.9, t(Iron Man 2)=0.3, ... ),(t(id1)=0.5, t(id3)=0.2, t(c1)=0.1, ... )}.

Figure 7:
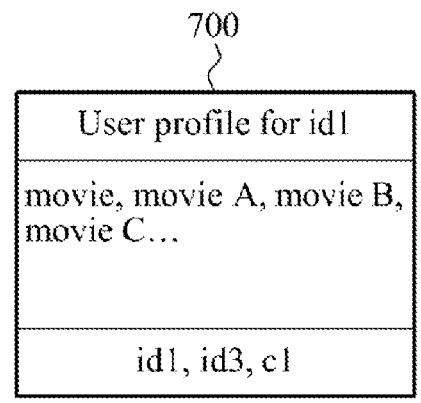
FIG. 7 is a diagram illustrating a user profile used to calculate an association between a personal network and a search term according to exemplary embodiments of the present invention.

FIG. 7 is a diagram illustrating a user profile used to calculate an association between a personal network and a search term according to exemplary embodiments of the present invention.

For example, the association between the personal network and the search term, that is, QDP($N_i$, Q) may be determined using Equation 3, as noted below.

$$QDP(N_i, Q) = \sum_{i=1}^{n} \frac{tf_{q_i}}{m \times \left((1-b) + n\frac{s(N_i)}{avg(s(n))}\right) + tf_{q_i}} \times \log\frac{c(N) - c(N_{q_i}) + k}{c(N_{q_i}) + h}$$ [Equation 3]

In Equation 3, Q denotes a search term, which may include at least one keyword q, such that Q={$q_1, q_2, \ldots, q_n$} denotes a weight of a keyword $q_i$ in a corresponding profile, where b is a constant. When an $m^{th}$ keyword corresponds to $q_i$, $tf_{q_i} = t_{N,m}$. When the $m^{th}$ keyword is different from $q_i$, $$tf_{q_i} = \frac{1}{\sum_j \sum_k t_{N_j,k}}.$$

In Equation 3, m, n, k, and h may correspond to constants, and may be variable depending on a configuration of the search result providing system.

$s(N_i)$ denotes a number of keywords in the profile, avg(s(N)) denotes an average number of keywords in the profile. c(N) denotes a number of personal networks, and c($N_{qi}$) denotes a number of personal networks where the keyword $q^i$ may be included in the profile.

Referring to FIG. 7, a profile of a user id7 700 is illustrated. It may be assumed that the user id7 700 inputs a search term "movie q1." For example, the search term may include a keyword "movie" and a keyword "q1." Keywords that the user id7 700 may be interested in include "movie, movie A, movie B, movie C", which may be extracted from documents prepared by the user id7 700. Neighbors of the user id7 700 may include a user id1, a user id3, and a community c1 joined by the user id7 700. In FIG. 7, $tf_{q1}$=0.9(movie), and tfq2=0.3 (q1) may be determined, and an association between the personal network and the is search term may be calculated by applying the foregoing values to Equation 3.

FIG. 8 is a diagram illustrating an example of a search result according to exemplary embodiments of the present invention.

FIG. 8 shows an example in which a search term may correspond to 'smart phone app,' and keywords included in a profile of a user having input the search term may correspond to "smart phone" and "app." In FIG. 8 search result 810 represents a conventional general search result, and a search result 820 represents a search result based on a personal network according to exemplary embodiments of the present invention.

Search result lists 811 and 812 in search result 810 may not be associated or may be less associated with the user, and may include general search results. Conversely, search result lists 821 and 822 in search result 820 may be highly associated with the user. The search result list 821 may include a document extracted from a community joined by the user, among personal networks of the user. The search result list 822 may include a document prepared by a neighbor of the user or a document extracted from a community joined by the neighbor of the user. The search result list 821 may be more highly associated with the user than the search result list 822.

Referring to FIG. 8, a probability of providing search result lists that the user may actually desire may be increased by providing the search result 820 based on the personal networks of the user, and accordingly a search satisfaction may also be increased, compared to when providing the conventional search result 810. In addition, an opportunity to extend a social network may be provided by recommending communities of neighbors which may be included in personal networks of the user, however, that are not yet joined by the user.

Figure 9:
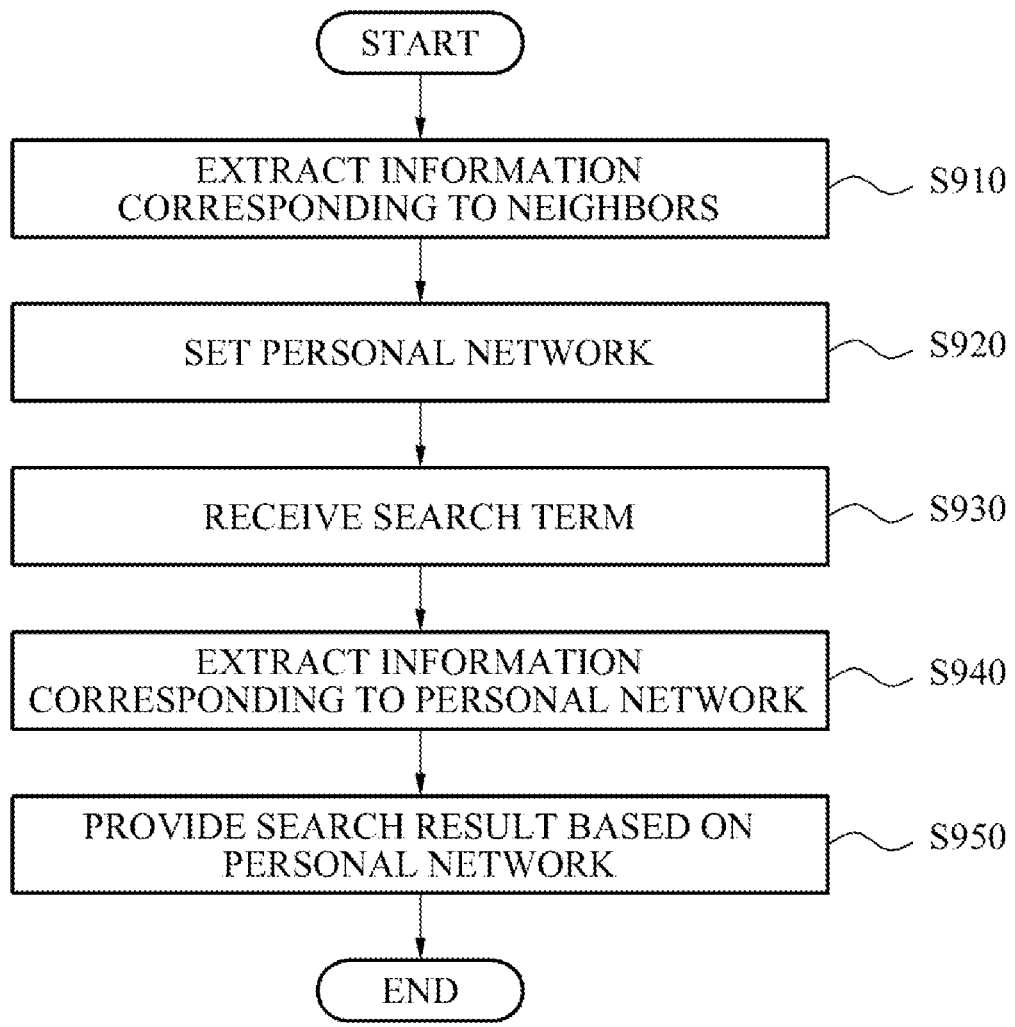
FIG. 9 is a flowchart illustrating a method of providing a search result according to exemplary embodiments of the present invention.

FIG. 9 is a flowchart illustrating a method of providing a search result according to exemplary embodiments of the present invention.

The neighbor information extraction unit 110 of the search result providing system 100 may extract information corresponding to at least one neighbor having similar interests to that of the user (S910). For example, the neighbor information extraction unit 110 may extract information of at least one neighbor of the user based on a profile of the user or neighbor information of the user. The neighbor information extraction unit 110 may generate a profile of the user using keywords included in a document prepared by the user, and may extract the information of the at least one neighbor of the user based on the generated profile of the user. The neighbor information of the user may be determined based on at least one of a social network of the user, an e-mail address book, and RSS subscription information.

The neighbor information extraction unit 110 may extract information corresponding to a first neighbor having similar interests to that of the user, and may extract information on up to an $N^{th}$ neighbor having the similar interests to the user, extended based on the first neighbor. For example, neighbors of the user may include a second neighbor, a third neighbor, and an $N^{th}$ neighbor, in addition to the first neighbor.

The personal network setting unit 120 of the search result providing system 100 may set at least one of communities joined by the user, neighbors of the user, and communities joined by the neighbors, to be personal networks of the user (S920). The neighbors of the user may correspond to neighbors from the first neighbor to the $N^{th}$ neighbor. The user may correspond to a user having input the search term. In some cases, the personal network of the user may be set in advance of inputting the search term, and stored in a database (DB), and, in some cases, the personal network of the user may be set in real time when the search term is input.

The search term reception unit 130 of the search result providing system may receive the search term from the user (S930). The search term may include at least one keyword.

The personal network information extraction unit 140 of the search result providing system 100 may extract information corresponding to at least one of a personal network associated with the search term, and a personal network associated with the user (S940). The personal network associated with the search term may be extracted based on an association between the search term and the personal networks, and the personal network associated with the user may be extracted based on an association between the user and the personal networks. For example, the personal network extraction unit 140 may arrange the set personal networks based on at least one of the association with the search result and the association with the user. The personal networks may be arranged in any suitable manner, including, for example, in a ranking order according to similarities to the user's interest.

Subsequently, the search term providing unit 150 of the search result providing system 100 may provide documents associated with the extracted personal networks, as a search result of the search term (S950). For example, the search result providing unit 150 may arrange the documents associated with the personal network, among documents associated with the search term, based on the association between the user and the personal networks, and may provide the arranged documents as the search result of the search term. For example, the search result providing unit 140 may place documents associated with communities joined by the user at a higher ranking than documents associated with communities joined by the at least one neighbor of the user, in the search result of the search term. Additionally, the search result providing unit 150 may recommend, to the user, communities not yet joined by the user based on at least one of an association with the search term and an association with the user.

According to exemplary embodiments, the search result providing unit 150 may provide the documents associated with the personal networks as a search result of the search term, by arranging the documents associated with the personal networks among documents associated with the search term based on an order of net association where an association with respect to the search term and an association between the user and the personal networks may be combined.

Various aspects of the invention, such as the search result providing system 100, may be implemented on one or more computer systems. For example, computer systems including a processor may be configured to communicate across wired or wireless networks (e.g., WAN, WLAN, WiMAX, mesh networks) to connect to a network, such as the Internet, and to execute various exemplary embodiments and functions described hereinabove. For example, a computer system including a processor may perform at least one of connecting to the Internet, connecting a user to a community, extracting neighbor information, determining keywords, setting the personal network of the user, receiving search terms, extracting personal network information, and providing a search result. Such computer systems may include input device(s), output device(s), processor(s), memory system(s), and storage unit(s), all or some of which are coupled, directly or indirectly, via an interconnection mechanism, which may be comprised of one or more buses, switches, and/or networks. The input device(s) may be any suitable device (e.g., keyboard, microphone, stylus pen) to receive input from a user or machine, and the output device(s) may be any suitable device (e.g., a liquid crystal display) to display or transmit information to a user or machine. For example, the search term reception unit 130 may be an input device, and the search result providing unit 150 may be an output device. The processor(s) may execute a computer program (e.g., an operating system) which controls the execution of other computer programs, and provides information extraction, network setting, scheduling, input/output and other device control, accounting, compilation, storage assignment, data management, memory management, communication, and data flow control.

The processor(s) may also execute one or more computer programs to implement various functions. These computer programs may be written in any type of computer programming language, including a procedural programming language, object-oriented programming language, macro language, or combination thereof. These computer programs may be stored in a storage system/medium, which may hold information on a volatile or nonvolatile medium, and may be fixed or removable.

The above-described exemplary embodiments of the present invention can be implemented in numerous ways. For example, the exemplary embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

It should be appreciated that the various methods/features outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

It should be appreciated that exemplary embodiments of the invention are also directed to a computer readable medium encoded with one or more programs including instructions that, when executed on one or more computers or other processors, perform methods that implement the various exemplary embodiments of the invention discussed above. The computer-readable media may include, but are not limited to, transitory and non-transitory media, and volatile and non-volatile memory. The computer-readable media may include storage media, such as, for example, read-only memory (ROM), random access memory (RAM), floppy disk, hard disk, optical reading media (e.g., compact disc-read-only memory (CD-ROM), digital versatile discs (DVDs), hybrid magnetic optical disks, organic disks, flash memory drives or any other volatile or non-volatile memory, and other semiconductor media. In some cases, the computer-readable media may be electronic media, electromagnetic media, infrared radiation, or other communication media such as carrier waves. Communication media generally embodies computer-readable instructions, data structures, program modules or other data in a modulated signal such as the carrier waves or other transportable mechanism including any information delivery media. The storage media may store any suitable and relevant information needed to execute exemplary embodiments of the invention. For example, the storage media may store network information, processor information, neighbor information, personal network information, received search terms, and generated search results.

Although exemplary embodiments of the present invention have been shown and described in the foregoing, it should be understood that exemplary embodiments of the present invention are not limited to the described embodiments. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system to provide a search result, the system comprising:
    a search term reception unit to receive a search term;
    a processor to extract information corresponding to at least one of a first personal network associated with the search term and a second personal network different than the first personal network;
    a search result providing unit to provide a document associated with at least one of the first personal network and the second personal network as a search result of the search term; and
    a neighbor information extraction unit to extract information corresponding to at least one neighbor having interests corresponding to interests of a user, the information corresponding to the at least one neighbor being based, at least in part, on a profile of the user, the profile being configured using keywords in a document prepared by the user, and the search term being received from the user, the keywords being time-variable and corresponding to keywords having the highest frequency of occurrence in the document.

2. The system of claim 1, further comprising:
    a personal network setting unit to set, as a personal network of the user, at least one of communities joined by the user, the at least one neighbor, and communities joined by the at least one neighbor.

3. The system of claim 2, wherein the neighbor information extraction unit is configured to extract information corresponding to a first neighbor having interests corresponding to interests of the user and information corresponding to an $N^{th}$ neighbor having interests corresponding to the interests of the user, and
    wherein N is a real number being equal to or greater than 2.

4. The system of claim 2, wherein the neighbor information extraction unit is configured to extract information from the at least one neighbor using the provided profile of the user.

5. The system of claim 2, wherein the neighbor information of the user is determined based on at least one of a social network of the user, an e-mail address book, and Really Simple Syndication (RSS) subscription information.

6. The system of claim 2, wherein the personal network extraction unit is configured to arrange the set personal network of the user based on at least one of an association with the search term and an association with the user, and to extract information corresponding to a neighbor or a community in a ranked personal network.

7. The system of claim 1, wherein the search result providing unit is configured to provide the document associated with the at least one of the first personal network and the second personal network as a search result of the search term by arranging the document among documents associated with the search term, based on an association between the user providing the search term and the at least one of the first personal network and the second personal network.

8. The system of claim 1, wherein the search result providing unit is configured to provide the document associated with the at least one of the first personal network and the second personal network as a search result of the search term by arranging the document among documents associated with the search term, based on an order of net association comprising an association with respect to the search term and an association between the user providing the search term and the at least one of the first personal network and the second personal network.

9. The system of claim 8, wherein the search result providing unit is configured to place, in the search result of the search term, documents associated with communities joined by the user at a higher ranking than documents associated with communities joined by at least one neighbor of the user.

10. The system of claim 2, wherein the search result providing unit is configured to recommend communities not yet joined by the user among the communities joined by the at least one neighbor, based on at least one of an association with the search term and an association with the user.

11. A method that utilizes a processor to provide a search result, the method comprising:
    receiving a search term from a user;
    extracting, via the processor, information corresponding to at least one of a first personal network associated with the search term and a second personal network different than the first personal network;
    extracting information corresponding to at least one neighbor having interests corresponding to interests of the user based, at least in part, on a profile of the user; and
    providing a document associated with at least one of the first personal network and the second personal network as a search result of the search term,
    wherein extracting the information corresponding to the at least one neighbor comprises:
        providing the profile of the user using keywords provided in a document prepared by the user, the keywords being time-variable and corresponding to keywords having the highest frequency of occurrence in the document.

12. The method of claim 11, further comprising:
    setting at least one of communities joined by the user, the at least one neighbor, and communities joined by the at least one neighbor, to be a personal network of the user.

13. The method of claim 12, wherein extracting information corresponding to the at least one neighbor comprises extracting information corresponding to a first neighbor having interests corresponding to the interests of the user, and extracting information corresponding to an $N^{th}$ neighbor having interests corresponding to the interests of the user, and
    wherein N is a real number being equal to or greater than 2.

14. The method of claim 12, wherein extracting information corresponding to the at least one neighbor further comprises:
    extracting the information corresponding to the at least one neighbor using the provided profile of the user.

15. The method of claim 12, wherein the neighbor information of the user is determined based on at least one of a social network of the user, an e-mail address book, and Really Simple Syndication (RSS) subscription information.

16. The method of claim 12, wherein extracting information corresponding to at least one of the first personal network and the second personal network comprises:

arranging the personal network of the user based on at least one of an association with the search term and an association with the user; and extracting information corresponding to a neighbor or a community in a ranked personal network.

17. The method of claim 11, wherein the providing comprises providing the document associated with the at least one of the first personal network and the second personal network as the search result of the search term by arranging the document associated with the at least one of the first personal network and the second personal network among documents associated with the search term, based on an association between the user providing the search term and the at least one of the first personal network and the second personal network.

18. The method of claim 11, wherein the providing comprises providing the document associated with the at least one of the first personal network and the second personal network as the search result of the search term by arranging the document associated with the at least one of the first personal network and the second personal network among documents associated with the search term based on an order of net association comprising an association with respect to the search term and an association between the user providing the search term and the at least one of the first personal network and the second personal network.

19. The method of claim 16, wherein the providing comprises placing, in the search result of the search term, documents associated with the communities joined by the user at a higher ranking than documents associated with communities joined by the at least one neighbor.

20. The method of claim 12, wherein the providing comprises recommending communities not yet joined by the user among the communities joined by the at least one neighbor, based on at least one of an association with the search term and an association with the user.

* * * * *